Patented Apr. 18, 1933

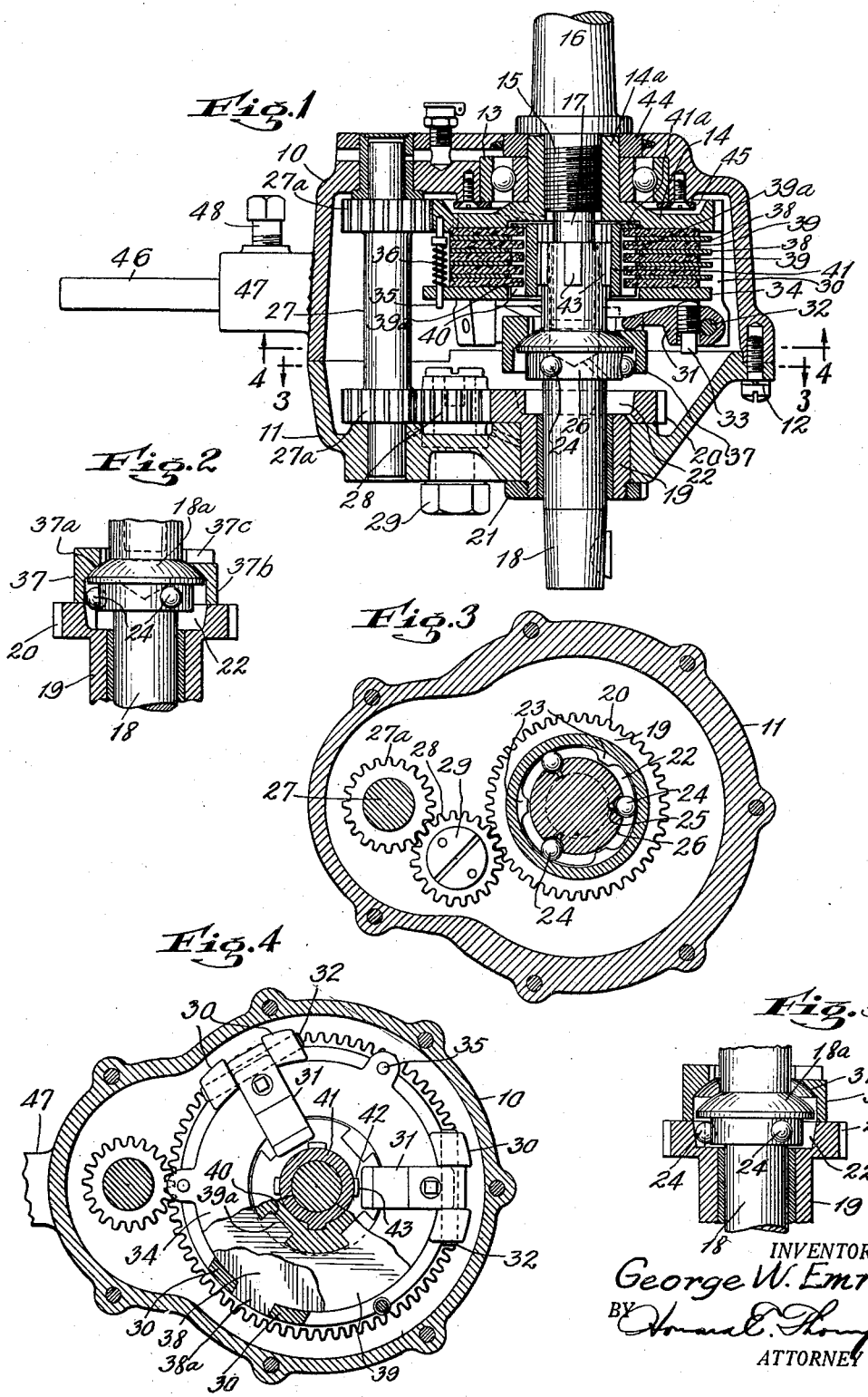

1,903,963

UNITED STATES PATENT OFFICE

GEORGE W. EMRICK, OF BROOKLYN, NEW YORK, ASSIGNOR TO ETTCO TOOL CO., INC., OF BROOKLYN, NEW YORK, A CORPORATION OF NEW YORK

MULTIPLE DISK CLUTCH

Application filed April 8, 1930. Serial No. 442,702.

This invention relates to tapping attachments and particularly to devices of this class employing a multiple disk clutch drive to the tap spindle; and the object of the invention is to provide improved means for equalizing the pressure upon the disks of the clutch to provide positive and dependable friction drive of the tap and in such manner as to obviate uneven wear upon the disks employed; a further object being to provide improved means for controlling the forward and reverse drive of the tapping attachment through a clutch element constituting part of the pressure equalizing member of the device; a further object being to provide improved means for coupling the disk clutch with the driven spindle in the forward or positive drive of the device; a still further object being to provide means for preventing the rotation of the casing of the attachment when in use; and with these and other objects in view, the invention consists in a device of the class and for the purpose specified which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a longitudinal, sectional view through my improved attachment.

Fig. 2 is a sectional detail view of parts of the construction shown in Fig. 1, illustrated in a different position.

Fig. 3 is a sectional, plan view on the line 3—3 of Fig. 1.

Fig. 4 is a similar section on the line 4—4 of Fig. 1 with part of the construction broken away; and, Fig. 5 is a view similar to Fig. 2 showing the parts in a different position.

In carrying my invention into effect, I provide a casing consisting of an upper part 10 and a lower part 11, said parts being secured together by a number of screws 12 spaced about the periphery of the abutting edges thereof. Arranged in the casing part 10 is a ball bearing 13 in which is supported a drive gear 14 having a hub portion 14a upon which the bearing is mounted said hub portion being internally threaded to receive the threaded portion 15 on the drive spindle 16. The spindle 16 terminates at its inner end in a projecting alinement stud 17 which fits within and serves to align the upper end of a driven spindle 18.

Rotatably mounted in the casing part 11 is a reversing clutch element 19 having a gear portion 20 arranged within the casing. The element 19 is held against displacement from the part 11 by the gear portion 20 and a nut 21 in threaded engagement with the tubular bearing portion thereof and arranged outwardly of the part 11.

The inner end of the element 19 has a large annular recess 22 arranged around the spindle 18 and the peripheral boundary wall of said recess has spaced inwardly projecting clutch elements 23, note Fig. 3, in connection with which are adapted to operate a plurality of clutch balls 24, said balls being supported in sockets 25 on the periphery of an enlarged portion 26 of the spindle 18.

A quill-gear 27 has its end portions supported in suitable bearings in the casing parts 10 and 11 as clearly seen in Fig. 1, and one gear 27a thereof meshes with an intermediate gear 28 supported on a gear stud 29 mounted in the casing part 11, said intermediate gear meshing with the gear portion 20 of the clutch element 19 as clearly seen in Fig. 3, while the upper gear 27b of said quill-gear meshes with the drive gear 14.

The gear 14 has inwardly projecting pairs of lugs 30 forming at their inner ends circumferentially spaced yokes in connection with which clutch dogs 31 are pivotally supported by pins 32 mounted in said lugs. Adjustably supported in the dogs 31 are dog screws 33, the rounded ends of which are adapted to operate in connection with a compression plate 34 of the disk clutch.

The plate 34 is supported on a plurality of pins 35 mounted in the gear 14 and on which are arranged coil springs 36 which normally serve to support said compression plate in firm engagement with said rounded ends of the screws 33, thus supporting the free ends of the dogs 31 in engagement with an equalizing ring 37 arranged on the spindle 18 and free to move radially with respect thereto as well as to oscillate with respect to the longitudinal plane of said spindle, the oscillation being permitted by virtue of a rounded bearing face 37a formed in the bore of said ring and operating upon a corresponding rounded collar 18a on the shaft 18 above and adjacent the enlarged portion 26, the collar 18a being of greater diameter than the enlargement 26 as clearly seen. The skirt portion 37b of the ring 37 is adapted to engage the inner face of the clutch element 19 when the tapping attachment is in what might be termed a neutral position. Said skirt portion 37b also operates in conjunction with the clutch balls 24 to retain them against displacement from the enlarged portion 26 when the spindle 18 is in its forward drive position as seen in Fig. 1 of the drawing as well as in the neutral position shown in Fig. 2. It will also be noted that the inner ends of the dogs 31 rest and operate in notches 37c formed on the upper face of the ring 37, thus keying said ring to the dogs and preventing relative rotary movement of said parts with respect to each other.

Arranged between the compression plate 34 and the gear 14 are a plurality of thin metallic clutch plates 38 and disposed between these plates and the plate 34 and gear 14 are friction disks 39 of fibrous or other suitable material. The plates 38 have spaced about the periphery thereof radially projecting key lugs 38a, and the disks 39 inwardly and radially projecting clutch lugs 39a. The lugs 38a fit between the pairs of lugs 30, note Fig. 4, it being understood at this time that the plate 34 is also keyed to said lugs in a similar manner whereas the lugs 39a are adapted to freely fit in sockets 40 formed in a clutch collar 41 arranged upon the upper end of the spindle 18, said collar being held against displacement from the gear 14 by an upper flange 41a cooperating with one of the disks 39. The bore of the clutch collar 41 has a plurality of longitudinal key grooves 42 in which a corresponding number of keys 43 on the spindle 18 operate. It will thus be apparent that in the longitudinal movement of the spindle 18 with respect to the clutch collar, said collar as well as the friction disks 39 are at all times keyed together. In the reverse drive of the spindle 18, said friction disks will be rotated in a reverse direction or a direction opposite to that of the clutch plates 38, the latter being constantly driven in the forward direction or the direction of revolution of the spindle 16 by virtue of the direct coupling therewith. In the reverse drive of the spindle 18, it will be understood that the clutch disks and plates are not in engagement.

It will be noted that the ball bearing 13 is held in position by two rings 44 and 45 and the casing made up of the parts 10 and 11 is held against rotation by a stop rod 46 detachably coupled with a boss 47 on the part 10 held against displacement therefrom by a set screw 48. As heretofore stated, in the normal position of the several parts of my tapping attachment, the equalizing ring 37 and spindle 18 will assume the position shown in Fig. 2. In operating a tap, after coupling the same within the spindle 18 through the usual chuck employed in devices of this class, the latter not being shown, and as the attachment is moved in the direction of the work and the tap engages the work, the spindle 18 is moved upwardly by the engaging pressure, thus raising the ring 37, moving the dogs 31 upwardly and applying pressure upon the compression plate 34 until such time as the friction plates 38 and disks 39 are brought into frictional engagement to drive the spindle 18 directly from the spindle 16 through said disk clutch. In the above operation, it will be understood that an equalized pressure is applied upon all of the dogs 31 by virtue of the radial and oscillatory movement of the ring 37 with respect to its seat 18a on the spindle 18. Therefore, an equalized pressure at three distributed points is applied to the compression ring 34. In this operation of the attachment, should the tap be subjected to undue stress or strain a free and independent movement of the plates 38 with respect to the disks 39 will be permitted, thus preventing any stress or strain upon the attachment.

In removing the tap from the workpiece, the upward pressure will cause the spindle 18 to be drawn downwardly into the position shown in Fig. 5 of the drawing, relieving the pressure of the dogs 31 upon the compression ring 34 and moving the clutch balls 24 into the recess 22 to engage the clutch elements 23 and the spindle 18 will be rotated in a reverse direction through the gear 14, the quill-gear 27, idler 28 and gear 20 on the reversing clutch element 19.

It will be understood that while I have shown certain details of construction for carrying my invention into effect and have illustrated a specific arrangement of the several parts, that my invention is not necessarily limited in these respects and various changes in and modifications of the construction herein shown and described may be made within the scope of the appended claims without departing from the spirit of my invention or sacrificing its advantages.

Having fully described my invention, what I claim as new and desire to secure by Letters Patent is:—

1. In a device of the class described, a drive member and a driven member, the driven member being movable longitudinally with respect to the axis of the drive member, a friction disk clutch arranged on said members at adjacent ends thereof, said clutch involving a series of clutch plate elements and a series of clutch disk elements interposed between said plate elements, one series of elements being keyed to the drive member and the other series of elements keyed to the driven member, tensional means for normally supporting said disks and plates in non-engaging position to permit free and differential rotary movement thereof with respect to each other, means actuated in one directional movement of the driven member for bringing the clutch elements in operative engagement in the direct drive of the driven member through said disk clutch, said means comprising dogs pivotally supported in connection with the drive member and circumferentially spaced with respect to said clutch elements, and an equalizing ring having a swivel mounting on the driven member and cooperating with the free ends of said dogs.

2. In a device of the class described, a drive member and a driven member, the driven member being movable longitudinally with respect to the axis of the drive member, a friction disk clutch arranged on said members at adjacent ends thereof, said clutch involving a series of clutch plates keyed to the drive member and another series of clutch disks interposed between said plates and keyed to the driven member, tensional means for normally supporting said disks and plates in non-engaging position to permit free and differential rotary movement thereof with respect to each other, means actuated in one directional movement of the driven member for bringing the clutch disks and plates in operative engagement in the direct drive of the driven member through said disk clutch, said means comprising dogs pivotally supported in connection with the drive member and circumferentially spaced with respect to said clutch disks and plates and an equalizing ring having a swivel mounting on the driven member and cooperating with the free ends of said dogs, a compression plate interposed between the clutch and said dogs, and means providing an adjustable bearing surface of the dogs on said compression plate.

3. In a device of the class described, a drive member and a driven member, the driven member being movable longitudinally with respect to the axis of the drive member, a friction disk clutch arranged on said members at adjacent ends thereof, said clutch involving a series of clutch plates keyed to the drive member and another series of clutch disks interposed between said plates and keyed to the driven member, tensional means for normally supporting said disks and plates in non-engaging position to permit free and differential rotary movement thereof with respect to each other, means actuated in one directional movement of the driven member for bringing the clutch disks and plates in operative engagement in the direct drive of the driven member through said disk clutch, said means comprising dogs pivotally supported in connection with the drive member and circumferentially spaced with respect to said clutch disks and plates and an equalizing ring having a swivel mounting on the driven member and cooperating with the free ends of said dogs, a compression plate interposed between the clutch and said dogs, means providing an adjustable bearing surface of the dogs on said compression plate, a clutch collar supported in connection with the clutch and to which said disks are keyed, and means for keying the driven member to said collar in such manner as to permit longitudinal, axial movement of the driven member with respect to said collar.

4. A device of the class described comprising a casing, a drive spindle rotatably mounted therein, a driven spindle arranged in axial alinement with the drive spindle and rotatable in said casing, said driven spindle being movable longitudinally with respect to the drive spindle, a clutch collar keyed to the driven spindle, a plurality of clutch disks keyed to said collar, a plurality of clutch plates keyed to said drive spindle, a plurality of dogs pivotally supported in connection with the drive spindle and arranged circumferentially of said disks and plates and adapted to move the same into clutching engagement with each other in coupling said spindles one with the other, and an equalizing ring mounted on and freely movable relatively to the driven spindle and cooperating with the free ends of said dogs for applying equalized pressure thereto and to said clutch disks and plates.

5. A device of the class described comprising a casing, a drive spindle rotatably mounted therein, a driven spindle arranged in axial alinement with the drive spindle and rotatable in said casing, said driven spindle being movable longitudinally with respect to the drive spindle, a clutch collar keyed to the driven spindle, a plurality of clutch disks keyed to said collar, a plurality of clutch plates keyed to said drive spindle, a plurality of dogs pivotally supported in connection with the drive spindle and arranged circumferentially of said disks and plates and adapted to move the same into clutching engagement with each other in coupling said spindles one with the other, an equalizing ring mounted on and freely movable relatively to the driven spindle and cooperating with the free ends of said dogs for applying equalized pressure thereto and to said clutch disks and plates, and an enlarged annular body on the driven spindle adjacent said ring, said body having a bearing surface arcshaped in cross sectional form upon which said ring has a swiveled mounting.

6. A device of the class described comprising a casing, a drive spindle rotatably mounted therein, a driven spindle arranged in axial alinement with the drive spindle and rotatable in said casing, said driven spindle being movable longitudinally with respect to the drive spindle, a clutch collar keyed to the driven spindle, a plurality of clutch disks keyed to said collar, a plurality of clutch plates keyed to said drive spindle, a plurality of dogs pivotally supported in connection with the drive spindle and arranged circumferentially of said disks and plates and adapted to move the same into clutching engagement with each other in coupling said spindles one with the other, an equalizing ring mounted on and freely movable relatively to the driven spindle and cooperating with the free ends of said dogs for applying equalized pressure thereto and to said clutch disks and plates, and tensional means for normally supporting said plates and disks in non-engaging position and for supporting said dogs in constant engagement with said equalizing ring.

7. A device of the class described comprising a casing, a drive spindle rotatably mounted therein, a driven spindle arranged in axial alinement with the drive spindle and rotatable in said casing, said driven spindle being movable longitudinally with respect to the drive spindle, a clutch collar keyed to the driven spindle, a plurality of clutch disks keyed to said collar, a plurality of clutch plates keyed to said drive spindle, a plurality of dogs pivotally supported in connection with the drive spindle and arranged circumferentially of said disks and plates and adapted to move the same into clutching engagement with each other in coupling said spindles one with the other, an equalizing ring mounted on and freely movable relatively to the driven spindle and cooperating with the free ends of said dogs for applying equalized pressure thereto and to said clutch disks and plates, a compression plate disposed between said clutch disks and plates and said dogs, and pins adjustably supported in said dogs and having rounded ends adapted to bear upon said compression plate.

In testimony that I claim the foregoing as my invention I have signed my name this 4th day of April 1930.

GEORGE W. EMRICK.